US008648864B2

(12) United States Patent
Wrinch

(10) Patent No.: US 8,648,864 B2
(45) Date of Patent: Feb. 11, 2014

(54) SYSTEM AND METHOD FOR BLENDED ANIMATION ENABLING AN ANIMATED CHARACTER TO AIM AT ANY ARBITRARY POINT IN A VIRTUAL SPACE

(75) Inventor: Steven Thomas Wrinch, Vancouver (CA)

(73) Assignee: Disney Enterprises, Inc., Burbank, CA (US)

( * ) Notice: Subject to any disclaimer, the term of this patent is extended or adjusted under 35 U.S.C. 154(b) by 1120 days.

(21) Appl. No.: 12/175,420

(22) Filed: Jul. 17, 2008

(65) Prior Publication Data

US 2009/0195544 A1      Aug. 6, 2009

Related U.S. Application Data

(60) Provisional application No. 61/026,405, filed on Feb. 5, 2008.

(51) Int. Cl.
*G06T 13/00* (2011.01)

(52) U.S. Cl.
USPC .......................................................... 345/473

(58) Field of Classification Search
None
See application file for complete search history.

(56) References Cited

U.S. PATENT DOCUMENTS

| 6,057,859 | A | * | 5/2000 | Handelman et al. | ........... 345/474 |
|---|---|---|---|---|---|
| 6,088,042 | A | | 7/2000 | Handelman et al. | |
| 6,535,215 | B1 | * | 3/2003 | DeWitt et al. | ................ 345/473 |
| 6,538,655 | B1 | * | 3/2003 | Kubota | ........................ 345/474 |
| 6,738,065 | B1 | | 5/2004 | Even-Zohar | |
| 6,791,569 | B1 | | 9/2004 | Millet et al. | |
| 6,947,046 | B2 | * | 9/2005 | Nimura et al. | ............... 345/473 |
| 7,242,405 | B2 | | 7/2007 | Cohen et al. | |
| 7,423,650 | B2 | * | 9/2008 | Lee et al. | ..................... 345/473 |
| 2002/0089507 | A1 | * | 7/2002 | Ohto et al. | .................... 345/474 |
| 2005/0171964 | A1 | * | 8/2005 | Kulas | ........................... 707/100 |

OTHER PUBLICATIONS

Charles F. Rose, III, et al.; Artist-Directed Inverse-Kinematics Using Radial Basis Function Interpolation; Eurographics 2001; vol. 20 (2001), No. 3.

* cited by examiner

*Primary Examiner* — Edward Martello
(74) *Attorney, Agent, or Firm* — Pillsbury Winthrop Shaw Pittman LLP

(57) ABSTRACT

A method for blended animation by providing a set of animation sequences associated with an animated character model is disclosed. In one embodiment, a geometric representation of a blend space is generated from the set of animation sequences using locator nodes associated with each animation sequence. A subset of animation sequences is selected from the set of animation sequences by casting a ray from a reference bone to a target through the geometric representation and selecting animation sequences that are geometrically close to the intersection of the cast ray and the geometric representation. A blend weight is determined for each member animation sequence in the selected subset of animation sequences. A blended animation is generated using the selected subset of animation sequences and the blend weights, then rendered to create a final animation.

22 Claims, 10 Drawing Sheets

SYSTEM AND METHOD FOR BLENDED ANIMATION ENABLING AN ANIMATED CHARACTER TO AIM AT ANY ARBITRARY POINT IN A VIRTUAL SPACE

CROSS-REFERENCE TO RELATED APPLICATIONS

The present application claims priority under 35 U.S.C. §119(e) to U.S. Provisional Application 61/026,405, filed Feb. 5, 2008, and which is incorporated by reference in its entirety.

BACKGROUND

1. Field of the Invention

The present invention relates, in general, to animation systems and, more particularly, systems, methods, software and devices providing blended animation enabling an animated character to aim at an arbitrary point in a virtual space.

2. Description of the Related Technology

Animation systems present animated characters (as used in the present disclosure, references to the term "character" may indicate a standard character such as a person, animal, or monster, or any other non-character animated object, depending upon context) in a three-dimensional virtual space. The virtual space is essentially a collection of mathematical models that define various objects, characters, scenery elements and the like that can interact with each other. The animated characters move by programmatic changes in various parameters of the mathematical models. The virtual space is rendered, that is, converted from a mathematical model to a visual representation suitable for viewing by a user, and presented on a display to a viewer. Interactive animation can involve game players who control animated characters. Other animated characters may be programmatically controlled. Such desirable characters will often mimic reality by showing awareness of other characters and objects in the virtual space. This is particularly difficult to implement for artificial intelligence (AI) characters that are partially or completely controlled by computationally implemented algorithms. Certain classes of AI characters may have the ability to look at things, aim at things, and attack things in the three dimensional virtual space.

Animation control refers generally to techniques for controlling a model of a character so that the animation of that model from one position to another appears realistic. In common animation systems, the model describing a character comprises a set of rigid segments connected by joints much like the skeleton of a living creature. An animation sequence comprises a series of poses that can be played to represent some action such as running, swinging, looking at something, and the like. Varying the angle of the joints can yield a very large number of poses. For characters that are user controlled, the animation control system is typically driven by user inputs received from a game controller, for example. For AI characters, the animation control system is driven by algorithms associated with the character itself in response to the state of an environment and events. Characters may also be a combination of user-driven and AI such that a user provides gross control and AI algorithms provide fine control over character behavior.

One animation technique involves pre-rendering a set of animation sequences where each member of the set represents a particular motion for a character or portion of the character. The animation sequences are called at appropriate times to present desired activity. Animated sequences may depict, for example, a character at rest, running, sitting, looking left/right, jumping, and the like. The sequences can be blended to generate complex character actions. For example, a looking left animation sequence can be blended with a looking up animation sequence to generate a blended animation that looks left and up simultaneously. In this manner, a relatively small set of animation sequences can be combined to represent a large range of character action. However, it may not be so easy to select which set members should be combined and how their individual contributions should be weighted in the blended animation to achieve a desired effect.

Inverse kinematics refers to techniques for determining the parameters of a jointed flexible object (also called a kinematic chain) in order to achieve a desired pose. Inverse kinematics are relevant to game programming and general 3D animation, where a common use is to make sure game characters can physically connect to the environment. For example, feet landing firmly on top of terrain when a character is walking, jumping, running, etc. These techniques enable an artist to express the desired spatial appearance of a character rather than manipulate joint angles directly. For example, an animator can move the hand of a 3D model to a desired position and orientation and software selects the appropriate angles of the wrist, elbow, and shoulder joints that correspond.

Unfortunately, standard inverse kinematic techniques only allow the animator an ability to control a limited number of bones and joints. For example, only the neck bone and the upper spine bone may be moveable. A character is aimed at a target by orienting the spine, for example, and the position of other bones in the model are calculated from the resulting transformations. While these techniques are useful for orienting part of the character it does not allow movement in other bones to reflect the pointing or aiming at an arbitrary point in space.

SUMMARY OF CERTAIN INVENTIVE ASPECTS

A method of blended animation in an animation environment comprising, providing a set of animation sequences associated with an animated character model, generating a geometric representation of a blend space from the set of animation sequences, selecting a subset of animation sequences from the set of animation sequences, determining a blend weight for each member animation sequence in the selected subset of animation sequences, and generating a blended animation using the selected subset of animation sequences and the blend weights.

An animation control system, comprising, a storage, a set of pre-rendered animation sequences associated with an animated character model stored in the storage, a processor in data communication with the storage wherein the processor is configured to, generate a geometric representation of a blend space, to select a subset of animation sequence from the set of animation sequences, determine a blend weight for each member animation sequence in the selected subset of animation sequences, and generate a blended animation using the selected subset of animation sequences and the blend weights.

An animation control system of wherein the processor is further configured to, identify a location of a target, cast a ray from the reference bone (as used herein, the term "reference bone" may refer to a reference bone or any other reference transform, i.e. a reference to a position and orientation in 3D space) to the target and passing through the convex hull, determine a polygon that is intersected by the ray cast from the reference bone to the target, and select the animation sequences associated with the vertices of the intersected polygon as the subset of animation sequences.

A model of an animated character wherein the model comprises a set of animation sequences stored on a storage medium wherein each animation sequence comprises a locator node indicating a point in space that is an approximation of where in space the animation sequence is aiming.

DETAILED DESCRIPTION OF CERTAIN INVENTIVE EMBODIMENTS

Certain embodiments involve animation control techniques for selecting a subset of pre-rendered animations that can be weighted and blended to generate a blended animation that presents a complex character action. These techniques are particularly useful for artificial intelligence (AI) characters in a game in that the techniques allow an AI character to respond to targets (e.g., other characters and objects) located at arbitrary locations in a scene. This allows the AI characters to show awareness of objects in three-dimensional space by looking at them, aiming at them and attacking them in a convincing manner. These inventive techniques of the present invention can be useful for augmenting control of non-AI characters (e.g., user-controlled characters) and may also be useful in non-gaming applications such as animated films and animation research.

Many embodiments can be implemented on a general purpose or special purpose computer system providing user interface, control, animation and display functions, or portions thereof. Examples of such systems include general purpose computers such as personal computers, workstations, handheld computers, personal digital assistants and the like; and special purpose computers such as game consoles, handheld computing devices, smartphones, arcade games, simulators, and the like. Such systems can be standalone or networked. Various hardware architectures such as multiprocessing, distributed processing, dedicated logic, and the like, can be used. Various software approaches can be employed including compiled or interpreted code, firmware, microcode, and the like. Functions of various embodiments can be performed in hardware or software to meet the needs of a particular application.

Various embodiments are described below with respect to an animated combat game. However, it should be apparent that these and other embodiments can be used to provide user input for the display of animated characters in other contexts, including two-dimensional and three-dimensional animated characters associated with sporting contexts or athletic events. Other applications are possible as where a system is used to simulate physical systems, physical kinematics, to develop models or animation sequences, for simulation purposes, etc.

Figure 1:
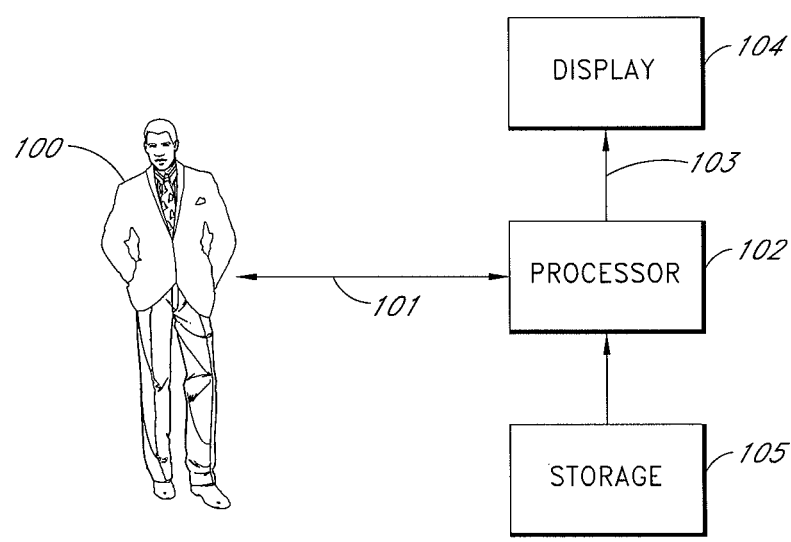
FIG. 1 is a block diagram of a computing environment that may be used in conjunction with inventive embodiments.

FIG. 1 is a block diagram of a computing environment that may be used in conjunction with inventive embodiments. In some embodiments, a user (also referred to as a player) 100 interacts via an interface 101 with a processor 102. The processor 102, is configured to send a display signal 103 to a display 104, for viewing by the user 100 and/or other people. The processor 102 is configured to take instructions and/or other data from a storage 105, that is preferably pre-configured to contain animation sequences or other data representative of possible states of an animation. The storage is configured to communicate with the processor over a bi-directional data path 106.

Figure 2:
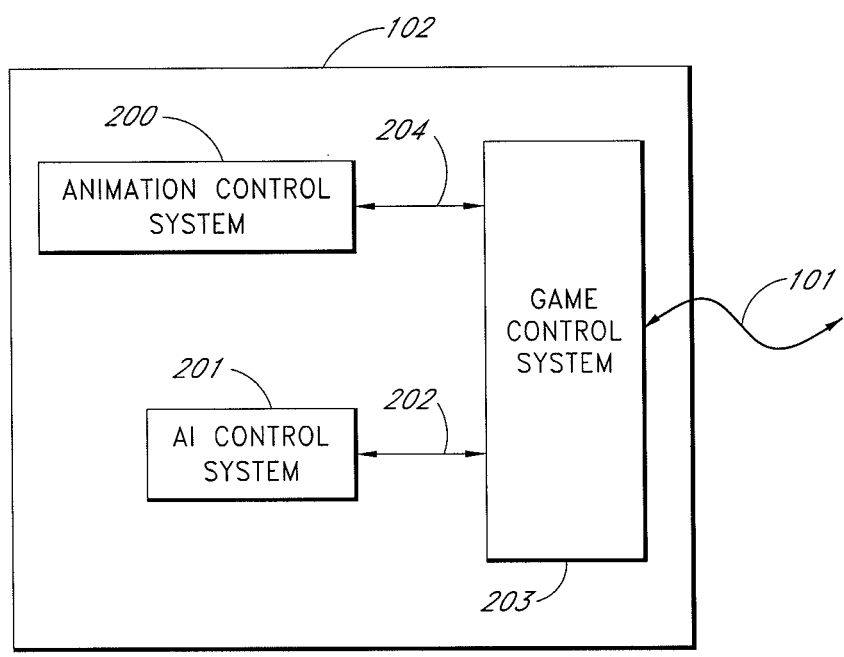
FIG. 2 is a block diagram of the processor of FIG. 1 according to one embodiment.

FIG. 2 is a block diagram of the processor of FIG. 1 according to one embodiment. The interface 101, communicates with a game control system 203. In some embodiments, the game control system 203 communicates over the data path 106, to receive needed information from the storage 105. The game control system 203 may be configured to run the logic of a video game according to instructions stored on the storage 105. In some embodiments, the video game includes instructions for creating a three-dimensional environment and for populating that environment with player-controlled and AI-controlled characters. As the game progresses, the player 100 may watch the game on the display 104, and use the interface 101 to command the game control system 203 how the player's character should respond within the game. The game control system 203 will communicate with an animation control system 200 over an animation interface 204, so that the animation system can provide animation instructions back to the game control system 203 or to another part of the processor 102. An artificial intelligence (AI) control system 201 monitors the location of characters under AI control via an AI interface 202 and provides the game control system 203 with information on how the AI characters should act within the game. The game control system 203 communicates with the animation control system 200 over the animation interface 204, as with player-controlled characters.

Figure 3:
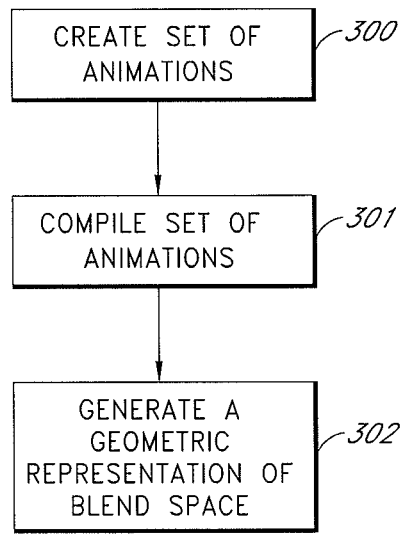
FIG. 3 is a flowchart of creating a set of animation sequences and a geometric representation of blend space which can be stored for reuse at runtime.

FIG. 3 is a flowchart of creating a set of animation sequences and a geometric representation of blend space which can be stored for reuse at runtime. In these embodiments, animators create a set of animations 300 that represents a range of actions for a particular character. Each of the animations can be created using any suitable animation technique and is generally a three-dimensional representation. The animations comprise a sequence of images that show a character taking some action such as looking left/right, looking up/down, running, swinging, and the like. The set of animations forms a base "vocabulary" for the particular character and allows an animator or AI engine to cause a certain character action by calling one or more animation sequences. Each member of the set of animations can be a pre-rendered animation sequence. Each animation sequence is associated with parameters that control the playback of the sequence. For example, a parameter may control the speed of playback, duration of playback, and/or number of times the playback is repeated. An animator or AI engine controlling the character will invoke sequences individually or in combination in response to a particular game state or event. Of course, non-game embodiments the state is of the application environment. When multiple sequences are invoked, a blending process will combine the individual sequences according to defined weights to generate a blended animation that more accurately represents the desired character action than any of the individual animation sequences by themselves. The set of animations is created when the game is built, prior to playing a game, so that the set of animations is available to be called upon during game play.

After the animations have been created, the animations are compiled at 301 using locator nodes associated with each of the individual animations. This compilation occurs offline, or during game play when a particular game state and events are known and it is desired that a character exhibit some behavior in response to the game state and/or events. The compiled sets are used to generate a geometric representation of blend space at 302 around the character to be used during animation.

Figure 4:
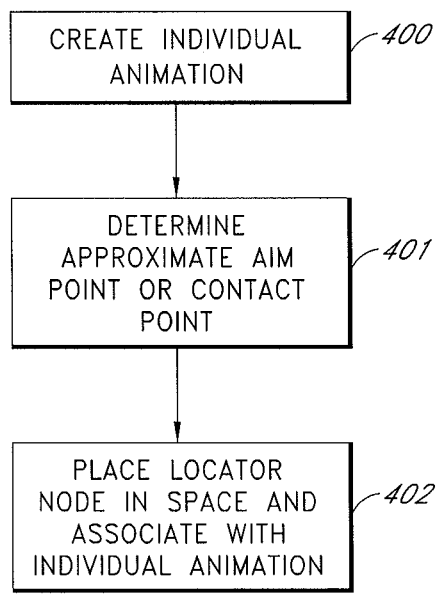
FIG. 4 shows detail of the processes involved in creating a set of animation sequences 300.

FIG. 4 shows detail of the processes involved in creating a set of animation sequences 300. This creation activity 300 is performed for each animation sequence in a set of animation sequences. Individual animations are created at 400 using any suitable technique as discussed previously. An approximate aim point or contact point is determined at 401 or specified for each animation sequence and a locator node is created at 402 and associated with each animation sequence to represent the approximate aim point or contact point. The locator nodes can be implemented as an auxiliary bone in a skeletal model of a particular animation sequence. The locator node identifies a point in space that is an approximate aim point or contact point for the individual animation sequence. The locator node is an approximation of an aim point in that a given animation sequence may represent motion through space during playback and so the exact aim point at any given point in time may vary over playback. However, for certain embodiments, a single locator node for each animation sequence that approximates the aim point or contact point of the animation sequence is sufficient. It is possible to have multiple locator nodes for some or all of the animation sequences with a corresponding increase in complexity of the solution.

In this way, each member of the set is associated with a locator node in space, for instance, when creating a spanning set of directions for a character to look, the animator will select a number of or locator nodes (which represent locations of potential targets) around the character to be looked at. The animator will create an animation for each locator node depicting the character looking at that selected node. An animator may choose to use many or few locator nodes depending on a balance between the need for accuracy of animation and the need for efficiency of animation. Moreover, the locations of the locator nodes may be symmetric or asymmetric depending upon the relative need for accuracy and detail in different blend configurations.

Figure 5:
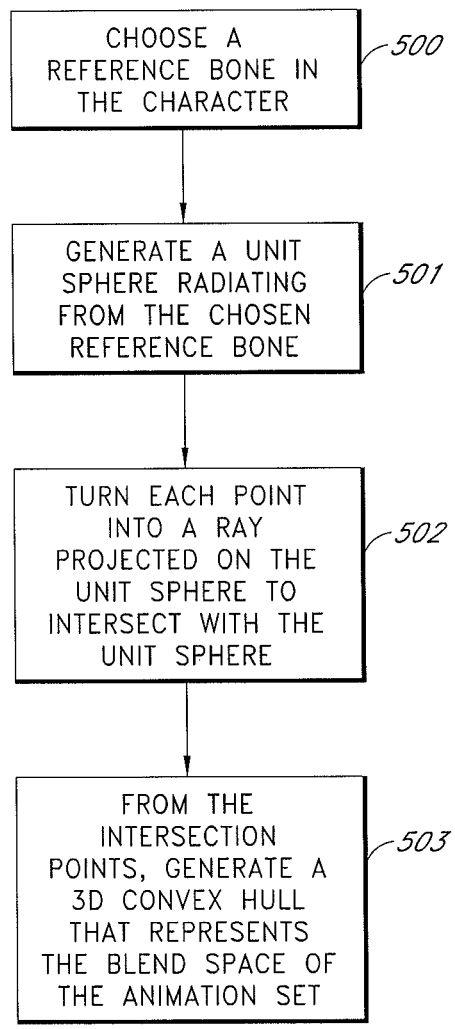
FIG. 5 is a flowchart of generating a geometric representation of a blend space.

FIG. 5 is a flowchart of generating a geometric representation of a blend space. A reference bone) in the character is selected at 500. Any bone in the character model may be selected, but a typical example might be a neck bone when it is desired that a character look up/down/left/right towards a particular target. A unit sphere is generated radiating from the chosen reference bone at 501. It is contemplated that shapes other than a sphere may be used as well to achieve particular effects, although a generally spherical shape provides accurate tracking of a target in conjunction with other process steps of the particular examples described herein. Each point represented by a locator node is turned into a ray projected on the unit sphere at 502. The ray projection is, for example, the shortest ray that spans from the locator point to the surface of the sphere such as a ray directed at the center of the sphere. The projected ray for each locator node will intersect the unit sphere at a point. Hence, each intersection point corresponds to a particular locator node and therefore a particular one of the animation sequences.

The set of intersection points are used to generate a three dimensional convex hull 503. The convex hull comprises a plurality of polygons with each vertex representing one animation in the animation set. In the particular examples described herein the polygons are triangles having three vertices where each vertex represents one animation sequence in the animation set. The hull may comprise other polygon shapes or multiple shapes although such variation may increase computational complexity with little improvement in result. In particular examples the polygons are flat surfaces that together approximate the shape of the unit sphere.

Figure 6:
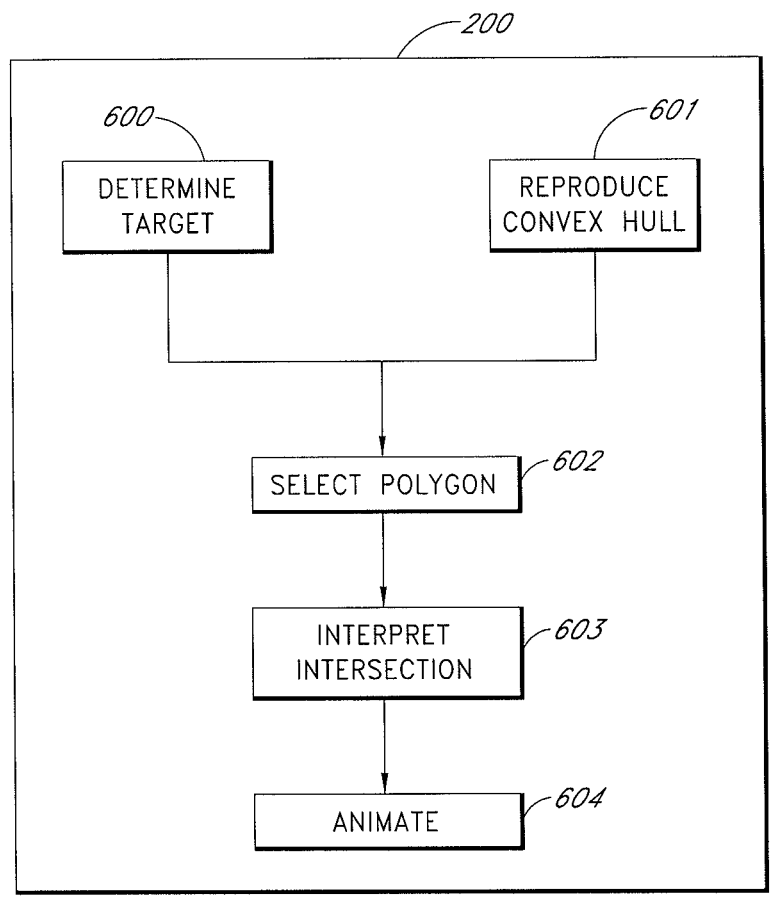
FIG. 6 shows processes involved in selecting a subset of animations suitable for a particular target.

FIG. 6 shows processes involved in selecting a subset of animations suitable for a particular target. A target is determined at 600 or presented to the animation control system 200 by the game control system 203. Also, a convex hull is reproduced at 601 around the character. From the information thus acquired at 600, 601, a polygon is selected from the convex hull at 602, and the intersection in the polygon is interpreted at 603. With information derived from the interpretation of the intersection 603, the animation control system 200 animates the character at 604. In particular, a set of animations to blend, and appropriate blend weights are determined. The blend weights are used to generate a spatially blended animation at 604 that represents a complex behavior that is a combination of the selected individual animation sequences. The spatially blended animation is played to present the character action to the user, for instance on the display 104. Playback of the blended animation may change the game state as well by moving a character to new coordinates in the game space, manipulating an object, changing the focus of a character, giving the character information and/or tools, or any number of state changes that are defined by the game. The final animation at 604 will provide a more convincing representation of a character orienting itself to a particular target at any location in the three dimensional game space.

Figure 7:
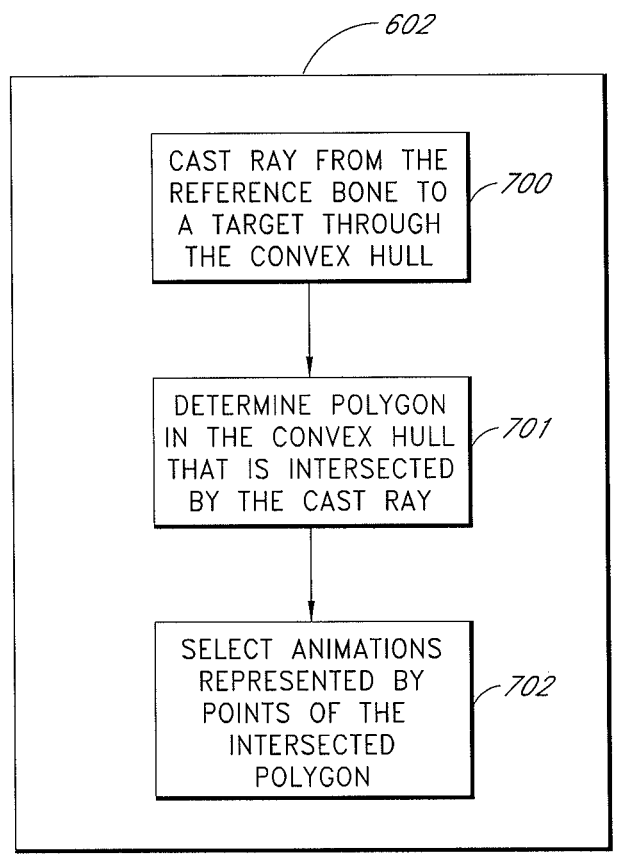
FIG. 7 shows a detailed view of the polygon selection process of FIG. 6.

FIG. 7 shows a detailed view of the polygon selection process of FIG. 6. In order to determine the appropriate polygon associated with the animations to be blended, a ray is cast at 700 from the reference bone towards a target. The target is an arbitrary point in space where an object such as another character or creature is located. A target can be anywhere in the three dimensional space surrounding a character. The ray cast from the reference bone will intersect the convex hull at a point in one of the polygons at 701. The vertices of the intersected polygon, each of which corresponds to a particular animation sequence, are used to select the animation sequences that will be used for the animation blending 702. In the particular example where the polygons are triangles there will be three animation sequences selected 702.

Figure 8:
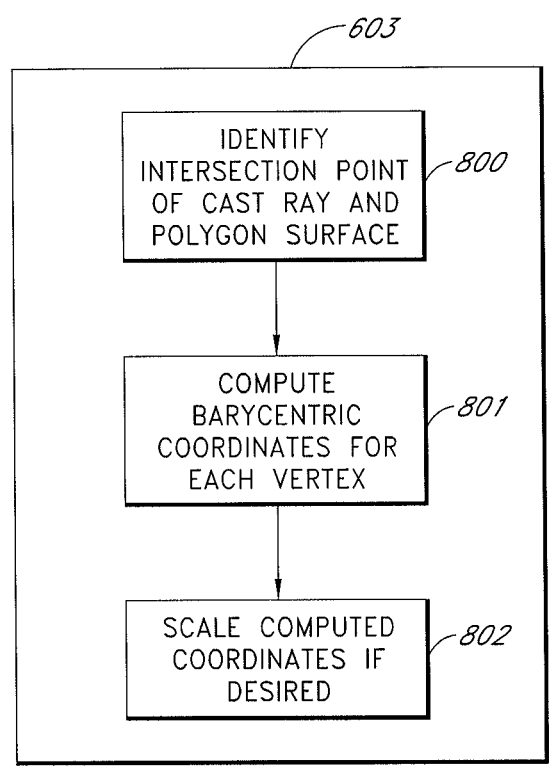
FIG. 8 shows processes involved in determining blend weights in accordance with an embodiment of the present invention.

FIG. 8 shows processes involved in determining blend weights in accordance with an embodiment of the present invention. The intersection point of the ray cast from the reference bone to the selected polygon 701 is identified at 800. The barycentric coordinates between the intersection point 800 and each vertex of the intersected polygon are computed at 801. The barycentric coordinates represent a distance between the intersection point and each vertex and other algorithms for determining a relationship between the intersection point and the vertices may be used to suit the needs of a particular application. In one implementation the barycentric coordinates are used directly to weight the corresponding animation sequence for use in blending animations together. Alternatively, the barycentric coordinates are first scaled 802, for example by squaring the computed value 801. The scaling may help compensate for the fact that the locator nodes are approximate locations and the convex hull is an approximation of the unit sphere. Other scaling factors may be suitable for particular applications.

Many alternative embodiments are possible. For instance, the embodiments described above made use of a ray projected through a convex hull that was centered on a character. In certain alternative embodiments, the convex hull may be located away from the reference character. For example, to animate a character riding in a motor vehicle, the convex hull could be centered at the center of mass of the motor vehicle. A unit mass, attached to one or more springs could be created within the convex hull. In such an example, as the vehicle moves, the unit spring will move in a delayed manner as an inertial body. A projected arc from the position of the mass corresponding to its lowest potential energy, through its current position, and into the convex hull, could be used to select blend weights for animation of the character as discussed above. Here, the unit mass is a reference bone analogous to the reference bones of some other embodiments described above. In this way, the character could be made to move within the vehicle in a realistic manner by blending animations selected by way of the moving unit mass.

In some embodiments, a determination will be made as to the location of the reference bone at the beginning of an animation sequence. This original location may then be saved and anchored to the reference bone and/or convex hull rather than anchor it to the character. In this way, the rotation of the character will not affect the blend weights through the course of animation. In some embodiments, for instance when a character will look around a world, a reference bone that is anchored to the character may be used. Where the reference bone is anchored to the character the blend weights will relate to the current orientation of the character.

Figure 9:
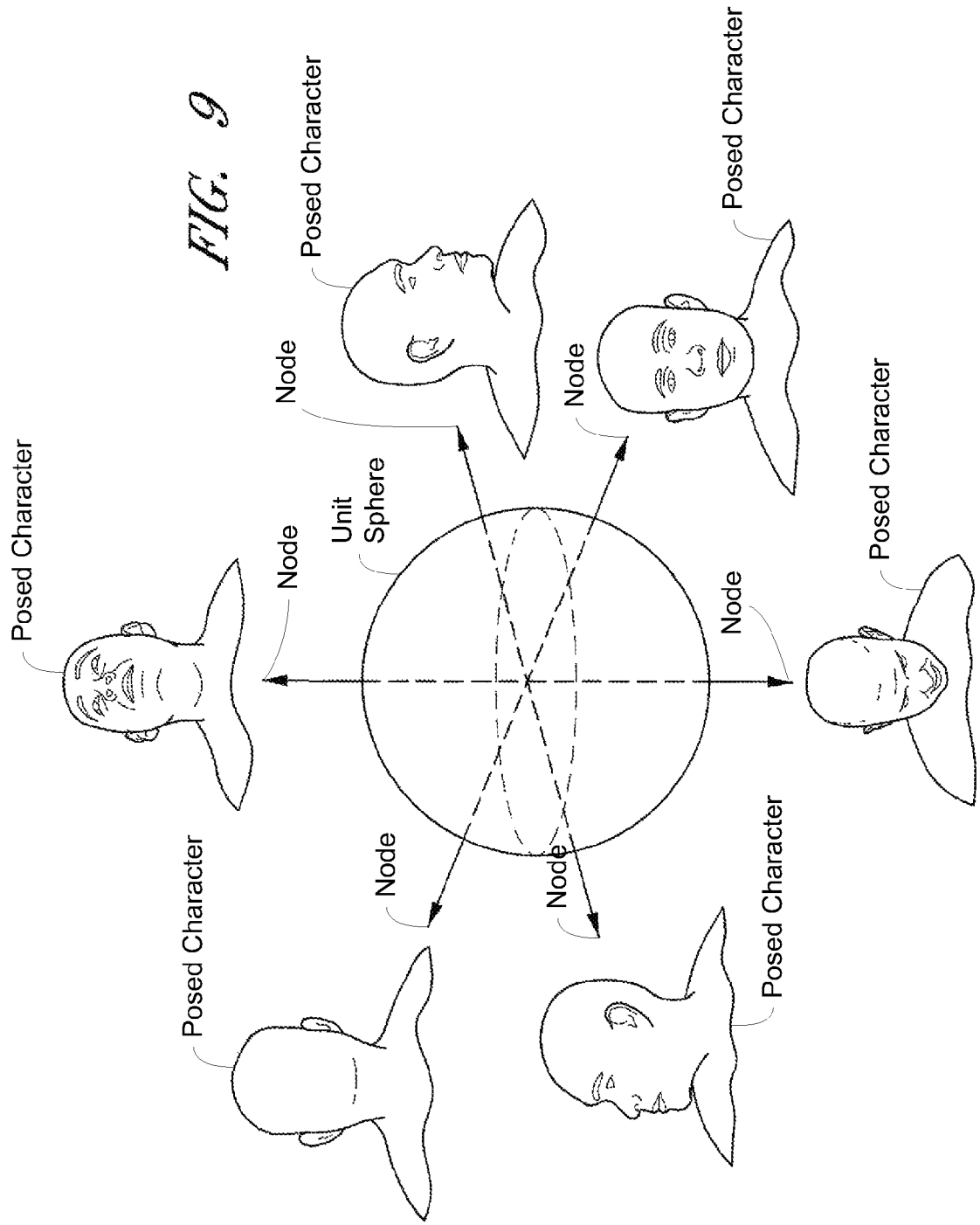
FIG. 9 shows a unit sphere with nodes corresponding to points in space as used in generating a geometric representation of blend space.

FIG. 9 shows a unit sphere with nodes corresponding to points in space as used in generating a geometric representation of blend space. A unit sphere is centered on the origin. A number of reference points surround the sphere, and a posed character is associated with each reference point. In FIG. 9, the associated posed characters are shown in space at their reference points for ease of illustration, in various embodiments, however, each of the posed characters is posed as if it is located at the origin and its pose (e.g. gaze, attack, etc) is directed at the reference point. A ray is projected through the unit sphere for each reference point, and the corresponding intersection (i.e. node) is associated with the corresponding posed character.

Figure 10:
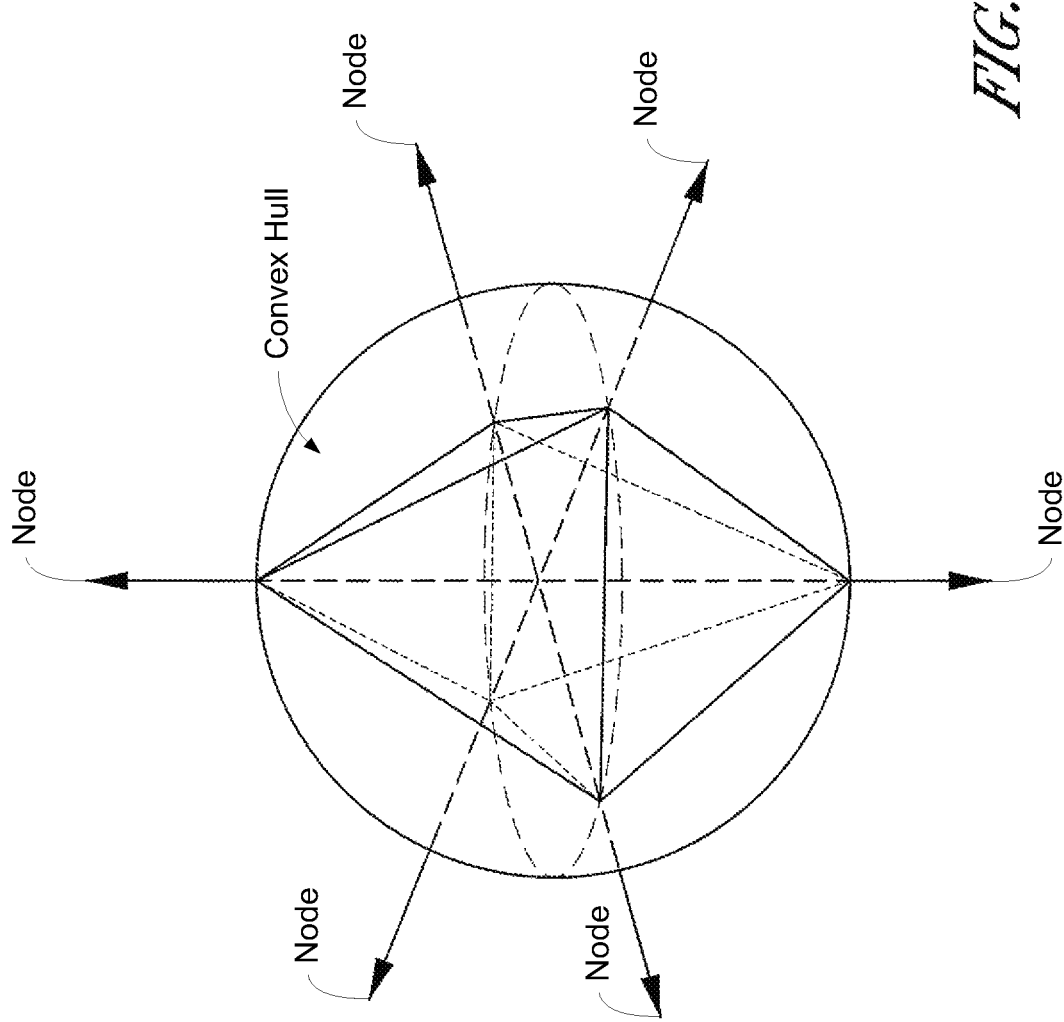
FIG. 10 shows a convex hull formed from the nodes of FIG. 9.

FIG. 10 shows a convex hull formed from the nodes of FIG. 9.

Figure 11:
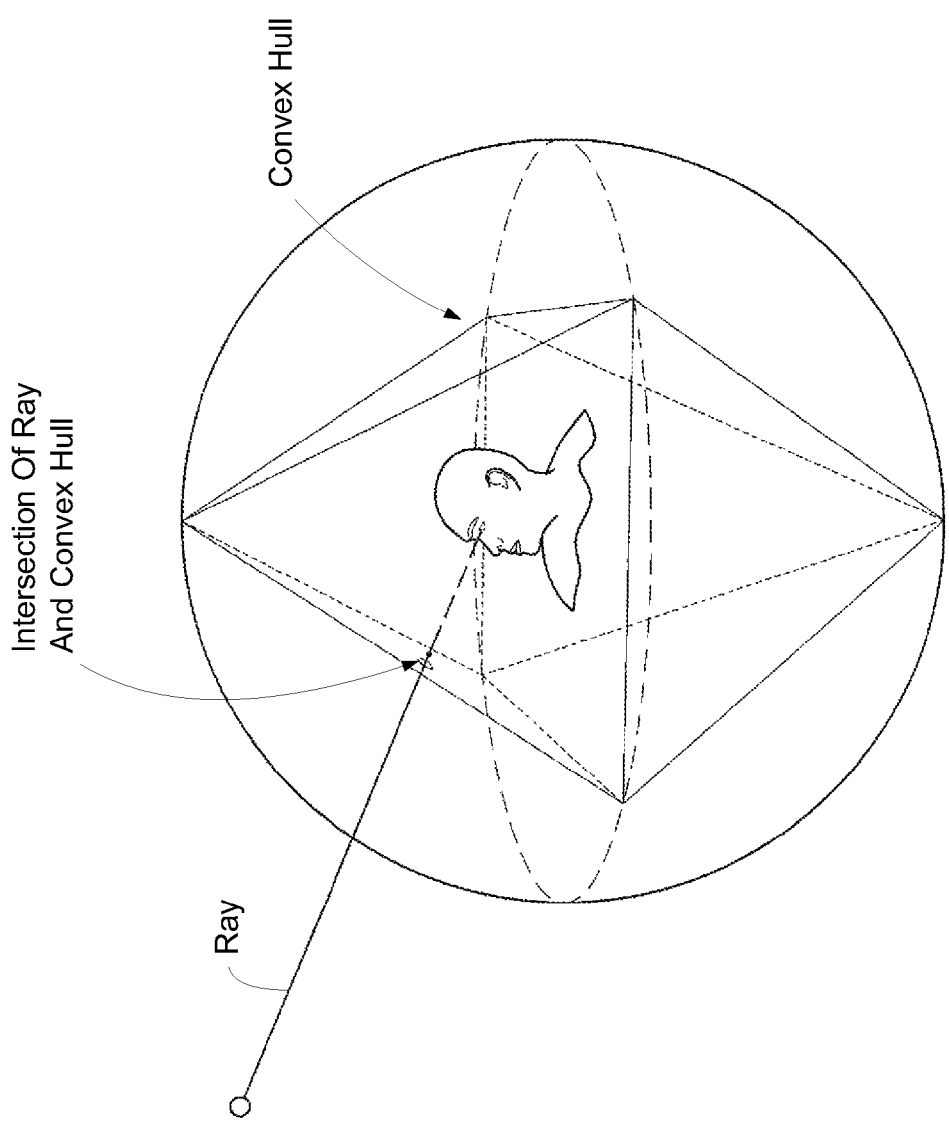
FIG. 11 shows a process for blending an animation based on the intersection of a ray and a convex hull.

FIG. 11 shows a process for blending an animation based on the intersection of a ray and a convex hull. A character to be animated is located at the origin of the convex hull, and a target is selected in space. A ray is projected from the character to the target, to select a point on one of the faces of the convex hull. Using a barycentric coordinate system, blend weights are selected for each of the nodes of the selected face. The character is then animated in accordance with the blend weights selected.

Although these numerous embodiments have been described and illustrated with a certain degree of particularity, it is understood that the present disclosure has been made only by way of example, and that numerous changes in the combination and arrangement of parts can be resorted to by those skilled in the art without departing from the spirit and scope of various embodiments, as hereinafter claimed.

What is claimed is:

1. A computer-implemented method of blended animation in an animation environment, wherein the method is implemented in a computer comprising one or more processors configured to perform operations of the method, the method comprising:
   providing a set of pre-rendered animation sequences associated with an animated character model;
   generating a geometric representation of a blend space from the set of pre-rendered animation sequences;
   selecting a subset of pre-rendered animation sequences from the set of pre-rendered animation sequences;
   determining a blend weight for each member pre-rendered animation sequence in the selected subset of pre-rendered animation sequences; and
   generating a blended animation using the selected subset of pre-rendered animation sequences and the blend weights such that during display of the blended animation, all of the selected subset of pre-rendered animations are displayed concomitantly, and weighted in accordance with the blend weights.

2. The method of claim 1, wherein providing a set of pre-rendered animation sequences comprises generating a plurality of pre-rendered animation sequences and associating a locator node with each of the plurality of pre-rendered animation sequences.

3. The method of claim 2, wherein the locator node comprises a point in space that is an approximation of an aim point or contact point for the associated pre-rendered animation sequence.

4. The method of claim 1, wherein the animated character model comprises a plurality of bones and wherein generating a geometric representation comprises:
   choosing a reference bone from the bones in the animated character model;
   generating a three-dimensional shape radiating from the chosen reference bone;
   drawing a ray from each locator node to a surface of the three-dimensional shape, wherein each ray intersects a surface of the three-dimensional shape at a point; and
   generating a three-dimensional convex hull comprising a plurality of polygons, the polygons having vertices at the intersection points of the rays and the three-dimensional shape, wherein the three dimensional convex hull represents a blend space of the animation set.

5. The method of claim 4, wherein the three-dimensional shape is a sphere.

6. The method of claim 4, wherein the polygons are triangles.

7. The method of claim 4, wherein each vertex of a polygon is associated with one pre-rendered animation sequence in the animation set.

8. The method of claim 4, wherein selecting a subset of pre-rendered animation sequences comprises:
   identifying a location of a target in the animation environment;
   casting a ray from the reference bone to the target and passing through the convex hull;
   determining a polygon that is intersected by the ray cast from the reference bone to the target; and
   selecting the pre-rendered animation sequences associated with the vertices of the intersected polygon as the subset of pre-rendered animation sequences.

9. The method of claim 8, wherein generating a blend weight comprises:
computing a barycentric coordinate for each vertex of the intersected polygon and the intersection point between the ray cast from the reference bone to the target; and
determining a blend weight for each pre-rendered animation sequence using the barycentric coordinate.

10. The method of claim 9, further comprising computing the square of each barycentric coordinate of a particular vertex as the blend weight for the pre-rendered animation sequence associated with the particular vertex.

11. An animation control system, comprising:
a storage;
a set of pre-rendered animation sequences associated with an animated character model stored in the storage;
one or more processors in data communication with the storage wherein the one or more processors are configured to:
generate a geometric representation of a blend space;
select a subset of pre-rendered sequence from the set of pre-rendered animation sequences;
determine a blend weight for each member pre-rendered animation sequence in the selected subset of pre-rendered animation sequences; and
generate a blended pre-rendered animation using the selected subset of pre-rendered animation sequences and the blend weights such that during display of the blended animation, all of the selected subset of pre-rendered animations are displayed concomitantly, and weighted in accordance with the blend weights.

12. The animation control system of claim 11, wherein the set of pre-rendered animation sequences comprises a plurality of pre-rendered animation sequences wherein each pre-rendered animation sequence is associated with a locator node.

13. The animation control system of claim 12, wherein the locator node comprises a point in space that is an approximation of an aim point or contact point for the associated pre-rendered animation sequence.

14. The animation control system of claim 11, wherein the processor is further configured to:
choose a reference bone in the animated character model;
generate a three-dimensional shape radiating from the chosen reference bone;
draw a ray from each locator node to a surface of the three-dimensional shape, wherein each ray intersects a surface of the three-dimensional shape at a point; and
generate a three-dimensional convex hull comprising a plurality of polygons, the polygons having vertices at the intersection points of the rays and the three-dimensional shape, where the three dimensional convex hull represents a blend space of the animation set.

15. The animation control system of claim 14, wherein the three-dimensional shape is a sphere.

16. The animation control system of claim 14, wherein the polygons are triangles.

17. The animation control system of claim 14, wherein each vertex of a polygon is associated with one pre-rendered animation sequence in the animation set.

18. The animation control system of claim 14, wherein the processor is further configured to:
identify a location of a target;
cast a ray from the reference bone to the target and passing through the convex hull;
determine a polygon that is intersected by the ray cast from the reference bone to the target; and
select the pre-rendered animation sequences associated with the vertices of the intersected polygon as the subset of pre-rendered animation sequences.

19. The animation control system of claim 18, wherein the processor is further configured to:
compute a barycentric coordinate for each vertex of the intersected polygon and the intersection point between the ray cast from the reference bone to the target; and
determine a blend weight for each pre-rendered animation sequence using the barycentric coordinate.

20. The animation control system of claim 19, wherein the processor is further configured to compute the square of each barycentric coordinate of a particular vertex as the blend weight for the pre-rendered animation sequence associated with the particular vertex.

21. A non-transient electronic storage medium having stored therein a model of an animated character wherein the model comprises a plurality of pre-rendered animation sequences, wherein each pre-rendered animation sequence is associated with a locator node indicating a point in space that is an approximation of where in space, with respect to an anchor point, the pre-rendered animation sequence is aiming.

22. The storage medium of claim 21, wherein the model further comprises a skeletal structure and the locator node is implemented as an auxiliary bone in the skeletal structure.

* * * * *